Figure 1:
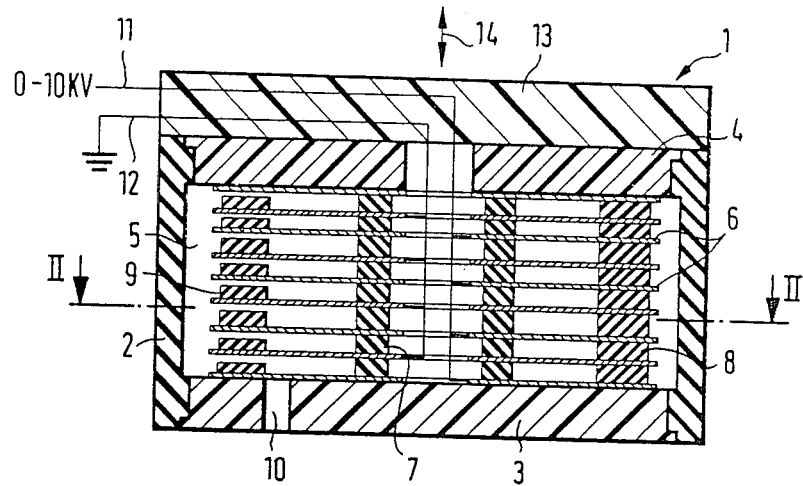

United States Patent [19]

Härtel

[11] Patent Number: 4,773,632

[45] Date of Patent: Sep. 27, 1988

[54] SPRING ELEMENT WITH HYDRAULIC DAMPING

[75] Inventor: Volker Härtel, Germering, Fed. Rep. of Germany

[73] Assignee: Metzeler Kautschuk GmbH, Munich, Fed. Rep. of Germany

[21] Appl. No.: 930,300

[22] Filed: Nov. 13, 1986

[30] Foreign Application Priority Data

Nov. 13, 1985 [DE] Fed. Rep. of Germany ....... 3540298

[51] Int. Cl.$^4$ .............................................. F16F 1/36
[52] U.S. Cl. .................... 267/140.1; 180/312;
180/902; 188/267; 248/550; 248/562; 248/636;
267/141.1; 267/152; 267/219; 280/710
[58] Field of Search ............... 188/267; 267/219, 122,
267/140.1, 141.1, 152; 280/710, 712, 716, 707,
708, 697; 248/550, 562, 566, 632, 634, 636;
180/300, 312, 902

[56] References Cited

U.S. PATENT DOCUMENTS

| | | | |
|---|---|---|---|
| 2,685,947 | 8/1954 | Voltrian | 188/267 X |
| 2,859,032 | 11/1958 | Johnson | 267/35 X |
| 2,973,969 | 3/1965 | Thall | 280/707 X |
| 3,436,042 | 4/1969 | Goubergen | 248/636 |
| 3,920,231 | 11/1975 | Harrison et al. | 267/219 X |
| 4,444,298 | 4/1984 | Stangroom | 192/21.5 |
| 4,688,776 | 8/1987 | Lecour et al. | 248/562 X |

FOREIGN PATENT DOCUMENTS

| | | | |
|---|---|---|---|
| 519818 | 12/1955 | Canada | 248/634 |
| 129944 | 8/1982 | Japan | 248/566 |
| 535095 | 3/1941 | United Kingdom | 248/632 |

*Primary Examiner*—George E. A. Halvosa

[57] ABSTRACT

A spring element with hydraulic damping includes a rubber-elastic peripheral wall and two rigid end walls defining a chamber therebetween, an electroviscous fluid filling the chamber, a stack of at least two metal plates disposed in the chamber, and elastic rubber elements disposed between and maintaining mutual spacings between the metal plates, the metal plates being alternately connected to a voltage source and to ground potential.

9 Claims, 1 Drawing Sheet

SPRING ELEMENT WITH HYDRAULIC DAMPING

The invention relates to a spring element with adjustable hydraulic damping.

In spring elements having hydraulic damping, such as those used for antivibration mounts for motor vehicle engines, the damping and stiffness values are largely fixed by the geometric shape of the elements and by the materials used. However, in two-chamber engine mounts, for instance, it is possible to vary these values and therefore to adapt to changing operating conditions, by varying the viscosity of the hydraulic fluid. In accordance with German Published, Non-Prosecuted Application DE-OS No. 33 36 965, corresponding to co-pending U.S. patent application Ser. No. 659,714 filed Oct. 11, 1984, this is done by using an electroviscous fluid and applying a voltage to suitable electrodes through which the fluid flows. During this process, the stiffness of the mount always varies simultaneously with the damping. In some cases, the change in stiffness is considerably greater than the change in the damping.

It is accordingly an object of the invention to provide a spring element with hydraulic damping which overcomes the hereinafore-mentioned disadvantages of the heretofore-known devices of this genereal type and in which the damping can be variably adjusted over a wide frequency range and in particular can be substantially increased, while the stiffness remains largely constant.

With the foregoing and other objects in view there is provided, in accordance with the invention, a spring element with hydraulic damping, comprising a rubber-elastic peripheral wall and two rigid end walls defining a chamber therebetween, an electroviscous fluid filling the chamber, a stack of at least two metal plates disposed in the chamber, elastic rubber elements disposed between and maintaining mutual spacings between the metal plates, and means for alternately connecting the metal plates to a voltage source and to ground potential.

As a spring element of this kind is deflected, the spacing between the metal plates decreases, so that the fluid located in the interstices is positively displaced to the outside. By applying a voltage to the metal plates, which act as electrodes, the viscosity of the fluid can be varied, and as a result the flow resistance and hence the damping of the spring element vary as well.

In accordance with another feature of the invention, the metal plates have an annular shape and a given surface area, and the rubber elements are vulcanized on to the metal plates and cover at most ⅓ of the given surface area of each of the metal plates.

In accordance with a further feature of the invention, the mutual spacings between each two of the metal plates is from 1 to 5 mm.

In accordance with an added feature of the invention, at least part of the rubber elements are disposed in the vicinity of the inner periphery of the annular metal plates and are in the form of a closed rubber ring.

In accordance with an additional feature of the invention, at least part of the rubber elements are disposed in the vicinity of the outer periphery of the metal plates and have a circular or prismatic cross section.

In accordance with yet another feature of the invention, at least part of the rubber elements are disposed in the vicinity of the outer periphery of the metal plates, are rib shaped and extend radially.

In accordance with yet a further feature of the invention, there are provided further rubber elements in the form of end stops disposed between and having less height than the rubber elements in the vicinity of the outer periphery of the metal plates.

In accordance with yet an added feature of the invention, the rubber elements are formed of an electrically insulating elastomer material having little intrinsic damping.

In accordance with a concomitant feature of the invention, the end walls are formed of plastic and the connecting means include voltage leads passing through the end walls.

Other features which are considered as characteristic for the invention are set forth in the appended claims.

Although the invention is illustrated and described herein as embodied in spring element having hydraulic damping, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 2:
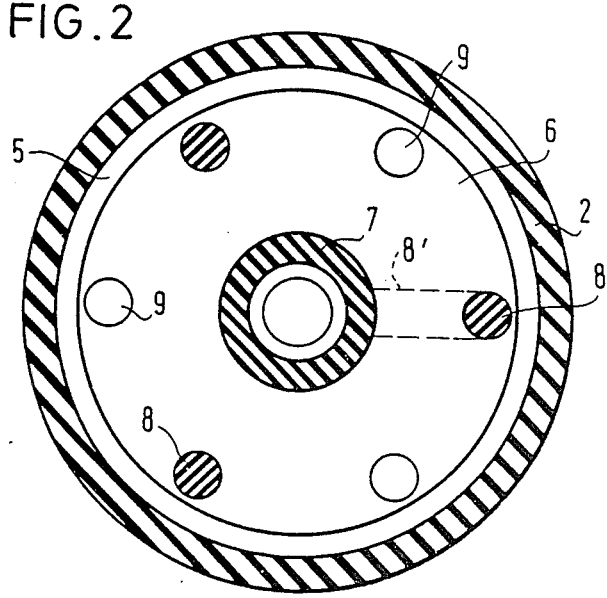

FIG. 1 is a diagrammatic, longitudinal-section view of a spring element according to the invention; and FIG. 2 is a cross-sectional view of the spring element taken along the line II—II in FIG. 1, in the direction of the arrows.

Referring now to the figures of the drawings in detail, there is seen a spring element 1 having an outer housing, which is formed of a cylindrical, rubber-elastic peripheral wall 2 and two solid end walls 3 and 4 which may be formed of plastic. Inside a chamber 5 enclosed by the wall elements, is a stack of nine metal plates 6 which, as shown in the cross section of FIG. 2, are in the form of circular disks and have a diameter smaller than the inside diameter of the rubber-elastic peripheral wall 2. Continuous rubber rings 7 are disposed in the vicinity of the inner periphery of the metal plates 6, while further circular disk-like, punctiform, rubber elements 8 having the same height as the rubber rings 7, are provided in the vicinity of the outer periphery of the metal plates. Additional rubber elements 9 having a lesser height can also be disposed between the outer rubber elements 8; in the relaxed state, the rubber elements 9 have no connection with the metal plates located above them. The mutual spacing between the metal plates 6, which are firmly joined to one another by the vulcanized-on rubber disks 7 and rubber elements 8, is suitably from approximately 1 to 5 mm.

The chamber 5 is completely filled with an electroviscous fluid, which can be introduced into it through a closable opening 10 in the end wall 3. The electroviscous fluid may, for example, be formed of a mixture of approximately 40 to 60% by weight of silicic acid as a solid, from 30 to 50% by weight of a suitable organic phase having a low electrical constant, from 5 to 10% by weight of water and approximately 5% by weight of a dispersing agent, and may have an intrinsic viscosity of from 100 to 3000 mPa×s.

The metal plates 6 are alternately connected through a lead 11 to a non-illustrated source of high voltage of from 0 to 10 kV and through a lead 12 to ground potential. The leads 11 and 12 which are axially disposed in the chamber, are connected to the metal plates 6 and extend to the outside through an upper cover plate 13, which may also be made of plastic.

The mode of operation of a spring element of this kind is as follows:

When force is exerted from above, as indicated by the arrow 14, the stack of metal disks 6 is compressed, which decreases the distance between the disks and positively displaces the fluid located in the interstices toward the outside. Upon being compressed, the quantity of fluid positively displaced between the metal plates 6 then flows into the annular outer space inside the peripheral wall, which bulges outward when compressed. When the spring element 1 relaxes, the fluid is positively displaced back into the space between the metal plates 6 by the ambient air pressure and by the restoring forces of the peripheral wall 2 as well, given a suitably volumetrically rigid embodiment of the wall.

The spacing between disks and the viscosity of the fluid determine the flow resistance of the fluid that flows back and forth in response to compression and relaxation. In response to a dynamic stress, such a spring element has characteristic damping curves that are distinguished by a notable independence of the dynamic stiffness from the frequency of the dynamic stress. If an electrical field is applied to the electrode system formed by the metal plates 6, the viscosity of the fluid increases sharply. This is expressed by a sharp increase in the damping, measured as a mechanical loss angle. The flow and hence the damping can be varied even further by providing a specialized embodiment of the rubber element 8 which may, for instance, be in the form of radial ribs 8' or by using the two types together.

Additionally, other rubber elements 9, for instance having only $\frac{2}{3}$ the height of the rubber elements 8, or the rubber rings 7 can be vulcanized on inbetween the rubber elements 8. A spring element of this kind then has a steep rise in the characteristic spring curve if the active spring height is compressed by more than $\frac{1}{3}$, because the rubber elements 9 having the lesser height act as soft stops. This reliably prevents a short circuit between the metal plates 6 and mechanically limits the maximal permissible field intensity between the electrodes.

Advantageously, the resilient rubber elements should be manufactured from an electrically insulating elastomer material having little intrinsic damping and should at most cover only about $\frac{1}{3}$ of the surface area of the individual metal plates 6.

Through the use of the above-described embodiments of the spring element and by using an electroviscous fluid, electrical control and monitoring of the damping of the element can be attained in a simple manner, while the stiffness values remain largely constant. By applying the electrical field, the viscosity of the fluid used can be varied by a factor of from 3 to 1000, depending on its composition and intrinsic viscosity and on the mechanical construction of the spring element. In the illustrated embodiments, a stack of nine metal plates 6 has been used. However, any other number of metal plates between two and twenty is possible, depending on the spring action and damping desired.

The foregoing is a description corresponding in substance to German Application No. P 35 40 298.9, dated Nov. 13, 1985, the International priority of which is being claimed for the instant application, and which is hereby made part of this application. Any material discrepancies between the foregoing specification and the aforementioned corresponding German application are to be resolved in favor of the latter.

I claim:

1. Spring element with hydraulic damping, comprising a rubber-elastic peripheral wall and two rigid end walls defining a chamber therebetween, an electroviscous fluid filling said chamber, a stack of at least two annular metal plates disposed in said chamber, elastic rubber elements disposed between and maintaining mutual spacings between said metal plates, said rubber elements including first rubber bodies in the form of closed rubber rings being disposed in the vicinity of the inner periphery of said annular metal plates and being vulcanized on to adjacent annular metal plates, said rubber elements also including second mutually equidistant and punctiform rubber bodies being disposed in the vicinity of the outer periphery of said annular plates, and means for alternately connecting said metal plates to a voltage source and to ground potential.

2. Spring element according to claim 1, wherein said metal plates have a given surface area, and said rubber elements are vulcanized on to said metal plates and cover at most $\frac{1}{3}$ of said given surface area of each of said metal plates.

3. Spring element according to claim 1, wherein said mutual spacings between each two of said metal plates is from 1 to 5 mm.

4. Spring element according to claim 1, wherein said second rubber bodies are rib shaped and extend radially.

5. Spring element according to claim 4, including further rubber elements in the form of end stops disposed between and having less height than said rubber elements in the vicinity of the outer periphery of said metal plates.

6. Spring element according to claim 1, including further rubber elements in the form of end stops disposed between and having less height than said rubber elements in the vicinity of the outer periphery of said metal plates.

7. Spring element according to claim 1, wherein said rubber elements are formed of an electrically insulating elastomer material having little intrinsic damping.

8. Spring element according to claim 1, wherein said end walls are formed of plastic and said connecting means include voltage leads passing through said end walls.

9. Spring element with hydraulic damping, comprising a rubber-elastic peripheral wall and two rigid end walls defining a chamber therebetween, an electroviscous fluid filling said chamber, a stack of at least two annular metal plates disposed in said chamber, elastic rubber elements disposed between and maintaining mutual spacings between said metal plates, said rubber elements including first rubber bodies in the form of closed rubber rings being disposed in the vicinity of the inner periphery of said annular metal plates and being vulcanized on to adjacent annular metal plates, said rubber elements also including second mutual equidistant insular and discrete rubber bodies having relatively small cross sections as compared to the cross section of said chamber and being disposed in the vicinity of the outer periphery of said annular plates, and means for alternately connecting said metal plates to a voltage source and to ground potential.

* * * * *